Feb. 2, 1960            C. M. PERKINS            2,923,175

POWER SHIFTED AUXILIARY TRANSMISSION

Filed Jan. 16, 1956            2 Sheets-Sheet 1

INVENTOR.
CHARLES M. PERKINS
BY
Woodhams Blanchard & Flynn
ATTORNEYS

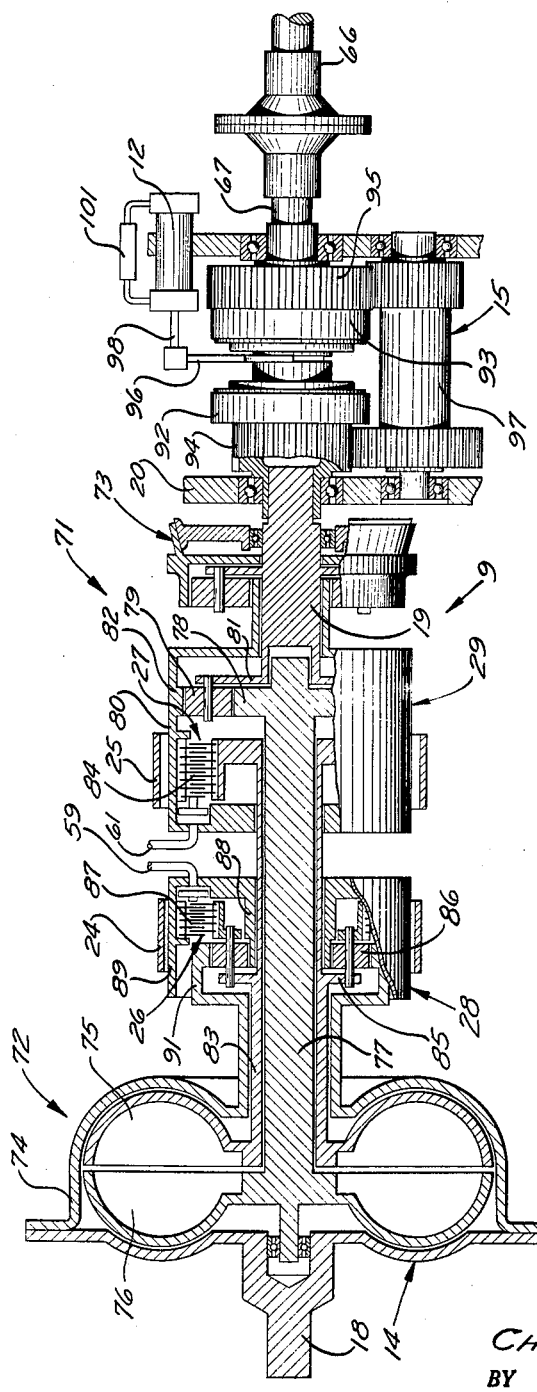

United States Patent Office
2,923,175
Patented Feb. 2, 1960

2,923,175

POWER SHIFTED AUXILIARY TRANSMISSION

Charles M. Perkins, Kalamazoo, Mich., assignor, by mesne assignments, to Fuller Manufacturing Company, a corporation of Delaware Application January 16, 1956, Serial No. 559,183

13 Claims. (Cl. 74—740)

This invention relates in general to an automatic transmission assembly having a main transmission whose engaging and disengaging parts include frictional devices, said main transmission being serially coupled with a two speed auxiliary transmission whose engaging and disengaging parts include positively interacting toothed elements. More specifically, this invention relates to electrically energized apparatus for simultaneously neutralizing said main transmission and shifting said auxiliary transmission, substantial completion of said shift effecting a deenergization of said electrical apparatus, whereupon said main transmission immediately resumes normal operation. In the embodiment used herein to illustrate the invention, said main transmission is comprised of an input shaft connected to a fluid coupling, a group of independently rotatable, constantly meshed groups of toothed elements and a control mechanism including friction clutches for automatically and selectively connecting said fluid coupling through selected ones of said groups of toothed elements to an output shaft. Said auxiliary transmission is comprised of a two speed gear box utilizing jaw clutches as the shiftable elements and having a power device for shifting said gear box from one speed to the other.

Previous practice has utilized an auxiliary two speed gear box connected in series with an automatic transmission for so-called "range shifting" association therewith, namely, a shifting through all the speed ratios of the main transmission with the auixiliary in one, as its low, position followed by a further progression of the main box through all of its speed ratios with the auxiliary in its other, as its direct drive, position. (Such system of shifting is further elaborated in United States Patent No. 2,637,221). However, such prior devices are, insofar as I am acquainted with them, manually operated and this gives rise to various operating difficulties.

In order to effect a shift of the auxiliary box, the main transmission must be neutralized and the auxiliary box synchronized. After the shift of the auxiliary box, the main transmission must be returned to its driving position. It is very difficult to effect this shift manually without some delay. Particularly, if the shift is being attempted on a grade, any excessive delay may allow too great a change in the vehicle speed to permit synchronization for the desired shift. This is particularly true in the case of diesel engines where the range of change in engine speed from idling to full throttle is relatively small, such as 1600 r.p.m.

Where, for example, the main transmission is of the type manufactured by the General Motors Corporation and referred to in the trade as the "Hydra-Matic" transmission, the main transmission must be neutralized substantially simultaneously with the commencement of the shifting operation in order to permit prompt synchronization of the auxiliary box, and the shift of the auxiliary box must then follow such synchronization without delay. If such neutralization does not occur ahead of attempted synchronization the synchronizers may be seriously damaged. On the other hand, if the movement toward synchronization of the auxiliary gears is materially delayed beyond the neutralizing of the main transmission, then the vehicle will change speed and the shift may be missed.

Accordingly, a primary object of this invention is the provision of an automatic transmission assembly having an automatic type main transmission coupled with a two speed, power shifted, auxiliary gear group and including electrically energized apparatus whereby the neutralization of said main transmission and the synchronization of said auxiliary gear group are initiated simultaneously, the main transmission immediately resuming normal operation substantially upon the completion of the shift in the auxiliary box.

A further object of this invention is the provision of apparatus, as aforesaid, which can be easily and quickly adapted for use with transmission assemblies presently in use, and which can be operated by a single switch conveniently located, as on the instrument panel in the cab of a truck or on the steering column.

A further object of this invention is the provision of apparatus, as aforesaid, the operation of which requires very little electrical energy, which energy can be supplied by the electrical system of a vehicle, and the apparatus is energized only during the very short time interval required to synchronize and shift the auxiliary transmission.

Other objects and purposes of this invention will become apparent to persons familiar with this type of equipment upon reading the following specification and examining the accompanying drawings, in which:

Figure 2 is a side elevation view, partially in central cross-section, of the "Hydra-Matic" type of torque converter coupled with a two speed, auxiliary transmission.

Figure 1:
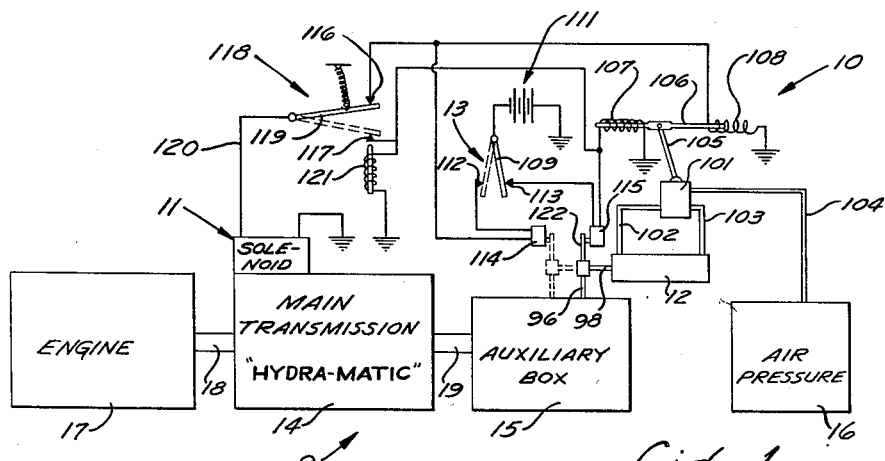
Figure 1 is a diagrammatic view of the apparatus to which this invention relates, including the transmission assembly which it is intended to operate.

For the purposes of convenience in description, the terms "front," "rear," and derivatives thereof, will have reference to the left and right ends, respectively, of the apparatus and parts associated therewith, as appearing in Figures 1 and 2. The terms "inner," "outer," and derivatives thereof, will have reference to the geometric center of said apparatus and parts associated therewith.

*General description*

As shown in Figures 1 and 2, the electrically energized apparatus 10 is designed to initiate simultaneously the actuation of a solenoid valve 11 and a power cylinder 12 upon operation of a manual switch 13. The solenoid valve 11 is connected to the main, automatic transmission 14, and the power cylinder 12 is connected to the shift mechanism of the two speed, gear type, auxiliary transmission. The main transmission 14 is of the "Hydra-Matic" type and the power cylinder 12 is actuated by a fluid, such as air, under pressure from a source 16. Moving of the switch 13 in either direction immediately places the main transmission in neutral and simultaneously urges the parts comprising the auxiliary ratio providing means in a shifting direction. Completion of the shift by the auxiliary ratio providing means deenergizes the electrical system and returns the main transmission to a power transmitting condition.

While vehicular, especially truck, use is here utilized for illustrative purposes and such is one of the primary uses contemplated for the apparatus of the invention, other uses will be apparent to persons acquainted with apparatus of the general type involved, such as cranes, hoists, and earth movers.

Detailed construction

Figure 3:
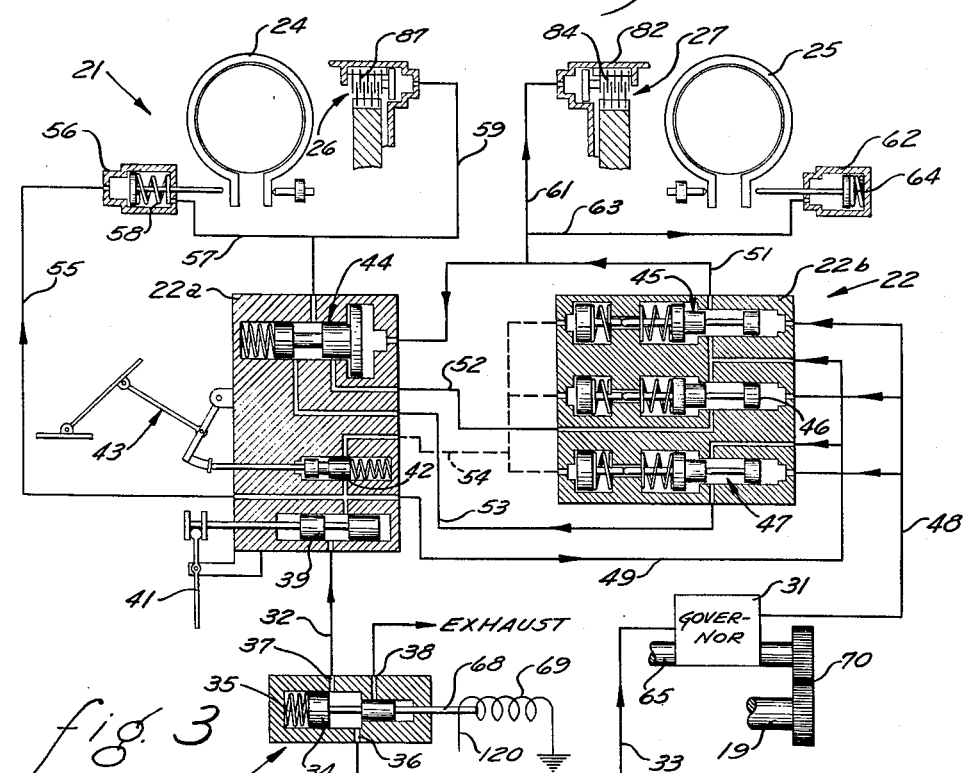
Figure 3 is a diagrammatic view of the control mechanism of said "Hydra-Matic" type transmission, with certain parts thereof detailed and shown in cross-section.

As shown in Figures 1 and 2, the main transmission 14 is preferably of the automatic type having an input shaft 18 connected to a fluid coupling which in turn is connected to an output shaft 19 through independently actuable groups of constantly engaged toothed elements, said groups being selected for connection between said fluid coupling and said output shaft by a plurality of friction clutches. The main transmission is connected to a conventional engine 17 by the input shaft 18 and it is connected to the auxiliary box or transmission 15 by the output shaft 19. The "Hydra-Matic," which is manufactured by General Motors Corporation, is a main transmission of this type and is disclosed herein for the purpose of demonstrating the features of the apparatus 10. Figure 3 shows the essential parts of a "Hydra-Matic" transmission which are controlled by the apparatus 10 during the shift of the auxiliary transmission 15. Figure 2 illustrates the parts of the "Hydra-Matic" transmission which are operated in response to the control mechanism 21 (Figure 3) of said "Hydra-Matic" transmission.

The operating mechanism 71 (Figure 2) of the main transmission 14 is comprised of a fluid coupling 72 and the front and rear planetary gear trains 28 and 29, respectively. A reverse gear train 73 is shown in the drawing, but since these are well understood a description thereof is believed unnecessary herein. The fluid coupling 72 has a housing or flywheel 74 which is connected to the input shaft 18 and which encloses the drive torus 75 and the driven torus 76. The driven torus 76 is mounted upon the leftward or front end of the inner main shaft 77, the right end of which supports the center gear 78 of the rear planetary train 29. The center gear 78 is engaged by planet gears, of which one appears at 79, which are rotatably supported by the planet carrier 81 mounted upon the output shaft 19. Said planet gears 79 are engaged by the internal or ring gear 82 which is in turn mounted on the shell 80 and engageable by the rear band 25. One set of the clutch plates 84 of the rear clutch 27 is mounted for rotation with the shell 80.

The drive torus 75 is mounted upon the front end of the outer main shaft 83, which is concentric with, and sleeved upon, the inner main shaft 77. The other set of clutch plates 84 of said rear clutch 27 are mounted upon, and supported by, the rightward end of the outer main shaft 83.

A planet carrier 85 is secured upon the outer main shaft 83, intermediate the ends thereof, and supports the planet gears 86 of the front planetary gear train 28 and one set of the clutch plates 87 of the front clutch 26. The center gear 88 is rotatably supported upon the outer main shaft 83 and engages the planet gears 86. A drum 89, which is secured to the center gear 88, is engageable by the front band 24 and carries the other set of the clutch plates 87 of the front clutch 26. A ring gear 91, which engages the planet gears 86, is rotatably mounted upon the outer main shaft 83 and is connected to, and rotatable with, the flywheel 74 of the fluid coupling 72.

The control mechanism 21 (Figure 3) of the "Hydra-Matic" transmission 14 includes a transmission valve assembly 22 which, for convenience, is illustrated in two separate parts 22a and 22b in Figure 3. The control mechanism 21 is operated by hydraulic fluid of any conventional type and the valve assembly 22 contains the valves for controlling the flow of such hydraulic fluid from a pump 23 to the front and rear bands 24 and 25, respectively, and to the servo controls 56 and 62 for the front and rear clutches 26 and 27, respectively. The said bands 24 and 25, which are secured to the main transmission housing a portion of which is shown at 20 in Figure 2, and said clutches 26 and 27 control the operation of the front and rear planetary gear trains 28 and 29, respectively.

The solenoid valve 11 (Figure 3) and the governor 31 are provided in parallel hydraulic conduits 32 and 33 between the pump 23 and the valve assembly 22. The solenoid valve 11 has a piston 34 backed by a spring 35 which is compressed by fluid pressure from the pump 23 acting against said piston to connect the input port 36 with the output port 37 and the conduit 32, while at the same time closing the exhaust port 38 in said solenoid valve 11. The conduit 32 is connected to a control valve 39 in the portion 22a of the valve assembly 22, said control valve 39 being operated by a manual shift lever 41. The portion 22a of said valve assembly 22 also contains a normally closed throttle valve 42 operated by the accelerator or throttle 43 of the engine 17 and a transition valve 44. The portion 22b of the control valve assembly 22 contains three similar shift valves 45, 46 and 47 for the purpose of automatically effecting the actuation of the said front and rear clutches and bands.

The governor 31 is connected by the conduit 48 to the shift valves 45, 46 and 47 for the purpose of opening same to effect an upshift of the transmission under normal torque loads. The control valve 39 is connected to each of said shift valves by the conduit 49. When any of said shift valves are in the open position, as shown in Figure 3, hydraulic fluid may flow through the open shift valves 45, 46 and 47 into the conduits 51, 52 and 53, respectively, to various portions of the transition valve 44. When the throttle valve 42 is actuated by an abnormally open throttle setting, hydraulic fluid can flow from the control valve 39 through the throttle valve 42 and through the conduit 54 to the shift valves 45, 46 and 47 for the purpose of closing said valves and effecting a downshift to meet the abnormal increase in torque load. The manual valve 39 is connected by the conduit 55 to the servo 56 which, when actuated by sufficient hydraulic fluid to overcome the spring 58, closes the front band 24.

The transition valve 44 is connected by the conduit 57 to the servo 56 for the purpose of opposing the fluid through conduit 55 and thereby permitting the spring 58 in said servo 56 to release the band 24. The transition valve 44 is also connected to the clutch 26 for the purpose of applying said clutch. The conduit 51 is connected to the rear clutch 27 by means of a conduit 61, and to the servo 62 by means of a conduit 63. The servo 62, when actuated by hydraulic fluid flowing through the conduit 63, releases the rear band 25, such release being resisted by compression of the spring 64. The governor 31 is mounted upon a shaft 65, which is rotated by the output shaft 19 of the main transmission 14 by a conventional gear train 70 (Figure 3).

The solenoid valve 11 is provided with a valve rod 68 which extends from the housing thereof and comprises the core of a solenoid 69, one terminal of which is connected to ground and the other terminal of which is connected to the conductor 120 hereinafter further mentioned.

This description of the main transmission 14 is believed adequate for the disclosure of the present invention. For further, more detailed description of the "Hydra-Matic" type of automatic transmission, reference is made to the "Operation and Maintenance Manual," No. X-5406, published by the GMC Truck and Coach Division of General Motors Corporation.

The auxiliary or rear box 15 may be of a substantially conventional, two-speed type, such as that fully disclosed and described in the Patent No. 2,637,221, issued May 5, 1953. The auxiliary box 15 has a pair of frictionally engageable synchronizers 92 and 93 (Figure 2) rotatably supported upon the auxiliary main shaft 67 between the auxiliary input gear 94 and the reduction gear 95 of said auxiliary box, together with suitable jaw clutches for providing positive interengagement between the input gear 94 and the main shaft 67. Thus, when the synchronizer 92 is actuated by the shift fork 96, the main shaft 67 of the auxiliary box 15 is in the usual manner first frictionally connected to the output shaft 19 of the main transmission 14 and subsequently said parts are positively connected by said jaw clutches. Thus, the propeller shaft 66 will rotate at the same speed as the output shaft 19. When the shift fork 96 moves rightwardly, it first effects a frictional engagement through the synchronizer 93 between the main shaft 67 and the reduction gear 95 and when the synchronizer 93 has brought together the speeds of the gear 95 and the shaft 67, continued rightward movement of the fork 96 effects a positive connection by the jaw clutch positioned between the gear 95 and the shaft 67. Thus, the auxiliary main shaft 67 is effectively driven by the output shaft 19 through the countershaft 97 and the pinions mounted thereon. The power cylinder 12, having an actuating arm 98 secured to the shift fork 96, may be mounted upon the auxiliary transmission 15 (Figure 2).

The apparatus 10 includes a two-position valve 101 which is connected by means of the pipes 102 and 103 with the opposite ends of the power cylinder 12. The valve 101 is also connected by means of the pipe 104 to a source 16 of fluid, such as air, under pressure. The valve 101 has a lever arm 105 for shifting the flow of fluid therethrough from one of said pipes 102 and 103 to the other. Said lever is secured to a solenoid core 106 intermediate the ends thereof, which ends are extendable into a pair of solenoids 107 and 108, one terminal of each solenoid going to ground. A single pole, double-throw, manually operable switch 13, such as a toggle switch, has its armature 109 connected to one terminal of a source of electrical energy, such as a storage battery 111, the other terminal of said battery being connected to ground. The poles 112 and 113 of the manual switch 13 are connected to the other terminals of the solenoids 107 and 108, respectively, through the parallel, normally closed, disconnect switches 114 and 115. The switches 114 and 115 are opened separately by a finger 122 mounted, in this particular embodiment, upon the actuating arm 98 of the power cylinder 12, as said arm 98 approaches or reaches one end or the other of its stroke. Said switches 114 and 115 are also connected to the poles 116 and 117 of the single pole, double throw solenoid switch 118, the armature 119 of which is connected by a conductor 120 to the open end of the solenoid 69 in the solenoid valve 11. The armature 119 is resiliently biased into a normally closed position against the pole 116 in this particular embodiment, the other pole 117 being in parallel with a self-locking solenoid 121.

*Operation*

The general operating principles of the "Hydra-Matic" type of automatic transmission are well known. It provides, among other things, a sequence of forward speed ratios which are automatically applied in response to the throttle setting of the engine 17 and the rotational speed of the output shaft 19 as sensed by the governor 31. The general principles involved in using a two-speed gear box to range shift in association with the speed ratios of a "Hydra-Matic" main transmission are also well known and will be readily understood as applied here.

For illustration, it will be assumed that the apparatus is in an upshift progression, that the main transmission has reached its high, or direct drive, setting but that the auxiliary gear group is still in its low speed setting. This is the normal condition calling for a range shift of the auxiliary gear box and a return of the main transmission to a lower ratio.

In the illustration of the control mechanism for the main transmission appearing in Figure 3, the hydraulic fluid is flowing through the conduits indicated by solid lines. With the equipment so operating, its condition is as follows: hydraulic fluid under pressure is being urged by the pump 23 to the governor 31 and to the solenoid 11 (Figure 3). The pressure produced by the pump 23 is sufficient to urge the solenoid piston 34 leftwardly within the valve 11 against the spring 35, thereby closing the exhaust port 38 and opening the outlet port 37 to the conduit 32 and thence to the control valve 39 attached to the shift lever 41. If, as in this particular example, the throttle 43 is being opened at a normal rate of acceleration, the throttle valve 42 will be closed, thereby preventing the flow of hydraulic fluid through the conduit 54 to the closing ends of the shift valves 45, 46 and 47.

The speed of the output shaft 19 (Figure 3) is such as to effect a rotation of the shaft 65 and the governor 31 at that speed which effects a flow of hydraulic fluid through conduits selected according to the speed of said governor and thence to a set of valves arranged to provide the proper operation of the clutches 84 and 87 and of the bands 24 and 25 to produce the desired speed ratio. In the particular instance here illustrated, the governor supplies pressure fluid through the conduit 48 to open the shift valves 45, 46 and 47, whereby the control mechanism 21 is placed in fourth speed. More specifically, the fourth speed is brought about by the valves 45, 46 and 47 being open and thereby permitting the flow of hydraulic fluid from the control valve 39 through the conduit 49, thence through the valves 45, 46 and 47 into the conduits 51, 52 and 53, respectively. The fluid passing through the conduit 51 actuates the transition valve 44 to block the fluid passing through the conduit 52. However, since valve 47 is open, fluid can pass through the conduit 53 and the transition valve 44 into the conduits 57 and 59. Hydraulic fluid also flows from the conduit 51 into the conduits 61 and 63, and from the manual valve 39 through the conduit 55 to the servo 56. The result of this flow of hydraulic fluid through the transmission control valve assembly 22, as shown in Figure 3, is to release the front band 24, apply the front clutch 26, apply the rear clutch 27, and release the rear band 25. Referring to Figure 2, it will be seen that such application of the bands and clutches will have the following results.

The front band 24, being released, will permit the drum 89 as well as the center gear 88 secured thereto, to rotate with respect to the transmission housing 20. The front clutch 26, being applied, will cause the planet carrier 85 to be locked, and to rotate, with the drum 89, thereby preventing rotation of the planet gears 86 about their own axes. Thus, the front gear train 28 will be in direct drive and the engine speed will be transmitted thereby from the shaft 18 to the outer main shaft 83.

The rotation of shaft 83 will be transmitted through the fluid coupling 72, less slippage losses, to the inner main shaft 77 to drive the center gear 78 of the rear planetary gear train 29, also at said engine speed.

As shown in Figure 3, the rear band 25 is released and the rear clutch 27 is engaged. Thus, the ring gear 82 of the rear planetary gear train 29 will rotate with the outer main shaft 83, hence at said engine speed. Accordingly, both the center gear 78 and ring gear 82 will be operating at substantially the same rotational speed. Since the planet gears 79 will be substantially fixed between, and will orbit around the common axis of, said ring gear 82 and center gear 78, the planet carrier 81 will also rotate at said engine speed. The planet carrier 81 being mounted upon the output shaft 19, said output shaft will thus also rotate at said engine speed and a direct drive, or a one-to-one ratio, is accomplished between the shaft 18 and the shaft 19.

Now it becomes desirable to make a further upshift of the entire transmission assembly. To do this, the armature 109 of the manual switch 13 is moved from its solid line position to its broken line position against the pole 112. This permits current to flow from the battery 111 through the manual switch 13 and the normally closed switch 114 to the solenoid 108, thereby shifting the valve 101 and permitting fluid under pressure to flow from the source 16 through the pipes 104 and 103 into the rightward end of the power cylinder 12, thereby urging the actuating arm 98 to its broken line position. Simultaneously, current flows through the normally closed pole 116 of the solenoid switch 119 into the solenoid 11, which, as shown in Figure 3, moves the piston 34 rightwardly and thereby closes the port 37 in the solenoid valve 11. This blocks the flow of hydraulic fluid through the conduits 32, 49 and 55. The control mechanism 21, hence the main transmission 14, is thus placed in neutral with the front band 24, the front clutch 26, and the rear clutch 27 all released, and with the rear band 25 engaged. Referring to Figure 2, it will be seen that with the two clutches and the front band released, the drive torus 75 will be disconnected from the driving force of the flywheel 74 and the center gear 88 may rotate freely upon the outer main shaft 83. The center gear 88 cooperates with the planet gears 86 to absorb any differential in speed between the flywheel 74 and the outer main shaft 83. Thus, the inner main shaft 77 and output shaft 19 may retard with the propeller shaft speed, during the synchronization of the auxiliary main shaft 67 with the auxiliary input gear 94, without injury to any of the parts in the engine 17, the main transmission 14, or the auxiliary transmission 15.

Leftward movement of the actuating arm 98 from its solid line position to its broken line position (Figure 1) effects first an engagement of the frictional synchronizing elements of the leftward synchronizer 92 in the usual manner and a resulting change in speed of the output shaft 19 to permit engagement of the jaw clutch elements by which a direct and positive drive between the output shaft 19 and the propeller shaft 67 will become established. This procedure is conventional and needs no detailing.

Completion, or substantial completion, of the leftward movement of the shift fork 96 effects an engagement between the finger 122 on the arm 98 and the disconnect switch 114. This opens the disconnect switch 114 and deenergizes the entire electrical apparatus 10, which includes a termination of the rightward urging of the valve 39 by the solenoid 69 whereupon the pressure of the pump 23 again moves the piston 34 leftwardly and permits the hydraulic fluid again to flow through the conduits in the control apparatus, thereby returning the main transmission to its operating condition. The reduction in rotational speed of the shaft, 19, is equivalent to the full range of ratios in the main transmission and hence the governor 31 will be immediately actuated to change the setting of the clutches 84 and 87 and bands 24 and 25 by which a low driving ratio between the input shaft 18 and the output shaft 19 is established. Thus, the shifting of the auxiliary ratios is completed quickly and the setting of the main transmission is automatically changed to whatever lower ratio is appropriate to the new speed of the shaft 19.

In a downshift progression, with the main transmission in a low speed position and the auxiliary in a high speed, as direct drive, position, it becomes desirable to shift the main transmission to a high speed position and to shift the auxiliary to its low speed position. To do this, the toggle switch 113 is moved from its broken line position in Figure 1 to its solid line position, thereby energizing the solenoid 107 and the solenoid 121. This shifts the valve 101 to energize the power cylinder 12 for urging the auxiliary box 15 rightwardly into reduced drive. Current also flows through both the normally closed switch 115 and the solenoid winding 121 of the switch 118, thereby moving the armature 119 from its solid line position against the pole 116 to its broken line position against the pole 117 and holding it there. The slight delay in effecting this movement of the armature 119 is negligible in the operation of the apparatus 10. This again energizes the solenoid valve 11 to neutralize the control mechanism 21 in the same manner as described hereinabove.

However, with the shift of the auxiliary transmission down to a low speed position, the load on the engine is lessened thereby permitting the engine to accelerate the output shaft 19 of the main transmission sufficiently to cause the governor 31 to rotate faster and open the valve 47. This permits the flow of hydraulic fluid through the conduit 53, the transition valve 44, the conduits 57 and 59, thereby applying the clutch 26 and releasing the band 24, which places the main transmission 14 in a high speed position, as its fourth speed. As soon as the finger 122 engages the switch 115, it disconnects the battery 111 from the remainder of the apparatus 10, thereby deenergizing the solenoid 121 and permitting its armature 119 to move back under the urging of its spring bias against the pole 116.

Thus, a complete cycle of operation of the apparatus 10 has been disclosed whereby the transmission assembly 9 has been both upshifted and downshifted through the steps requiring simultaneous shifting of the main transmission and the auxiliary transmission.

All that is required to accomplish these shifts of the auxiliary transmission, hence the transmission assembly 9, is the movement of a simple toggle switch 13 by the operator of the transmission assembly. Thus, with the low speed setting of the auxiliary transmission, when the engine reaches the maximum speed which is desirable, the switch 13 is activated and the transmission assembly 9 is automatically upshifted, as above described, if the other operating conditions permit. Conversely, with the auxiliary transmission in its high speed position when the engine speed is slowing more than is desirable, the operator needs only to move the toggle switch in the opposite direction and the equipment automatically and immediately provides the downshift as above described. After either the upshift or the downshift described, the main transmission will in the usual manner find and assume whatever gear ratio is appropriate to the then existing driving conditions.

While the upshifting range shift of the auxiliary was above indicated as made from the fourth, or direct, drive position of the main transmission, it will be recognized that it may be made from any ratio condition of the main transmission in the same manner as above set forth. Likewise a downshifting range shift may be made from any ratio position of the main transmission.

While the foregoing description has assumed that the auxiliary gear group is provided with ratios appropriate to range shifting, it will be apparent from the foregoing that both the system and the specific mechanism employed are with only slight modifications applicable also to split-shifting, wherein the auxiliary is utilized to split the ratios between the steps of the main transmission.

Although a particular, preferred embodiment of my invention has been disclosed hereinabove for illustrative purposes, it will be understood that variations or modifications thereof which lie within the scope of such disclosure are fully contemplated unless specifically stated to the contrary in the appended claims.

I claim:

1. In a transmission assembly having an automatic, speed and throttle responsive, main transmission and a shiftable two speed, auxiliary gear group, including shiftable components and frictionally engageable synchronizers, serially connected to said main transmission, the combination comprising: first electro-responsive means for neutralizing said main transmission; pressure actuated means for selectively shifting said shiftable components of said auxiliary gear group between their two speed ratio positions wherein each shifting operation includes first engaging one of said synchronizers and subsequently shifting said shiftable components to the position corresponding to the desired speed ratio thereof; second electro-responsive means for actuating said pressure actuated means; manually responsive electrically energized means for simultaneously energizing said first and second electro-responsive means; and disconnect means responsive to a substantially completed shift in said auxiliary gear group for deenergizing said first and second electro-responsive means.

2. In a transmission assembly having a main transmission, arranged for automatically selecting a torque ratio in response to its output speed and the setting of an engine throttle, coupled with a shiftable two speed auxiliary gear group including shiftable components and frictionally engageable synchronizers, the combination comprising: first electro-responsive means for neutralizing said main transmission; a source of fluid under pressure and power means actuable thereby for selectively shifting said shiftable components of said auxiliary gear group between the two speed ratio positions thereof wherein each shifting operation includes first engaging one of said synchronizers and subsequently shifting said shiftable components to the position corresponding to the desired speed ratio thereof; valve means controlling the flow of fluid through said power means; second electro-responsive means for operating said valve means; a source of electrical energy and manually responsive means for simultaneously connecting said source of electrical energy to said first and second electro-responsive means; switch means immediately responsive to a completed actuation of said power means for disconnecting said source of energy from said first and second electro-responsive means.

3. The structure of claim 2 wherein said shiftable components include a shift mechanism, said power means is a power cylinder operably connected to said shift mechanism, said valve means selectively connects said source of fluid pressure to the opposite ends of said power cylinder, and said second electro-responsive means effects such selection of said valve means.

4. The structure of claim 2 wherein said shiftable components include a shift mechanism, said power means is a power cylinder operably connected to said shift mechanism, said switch means includes a pair of normally closed, parallel switches both connected to said first and second electro-responsive means, one of said switches at a time being connected to said source of energy by said manually responsive means, and said one switch is opened in response to movement of said shift mechanism as a shift of said auxiliary gear group is completed.

5. The structure of claim 2 wherein said shiftable components include a shift mechanism, said power means is a power cylinder operably connected to said shift mechanism, said manually responsive means includes a single pole, double-throw switch, said switch means includes a pair of normally closed switches, each connecting one of said poles to both said first and second electro-responsive means, and said second electro-responsive means causes said shift mechanism to open the one of said closed switches connected to said source of energy as a shift of said auxiliary gear group is completed.

6. The structure of claim 2 wherein said first electro-responsive means includes a single pole, double-throw switch with the armature spring loaded against one pole and having a self-locking solenoid in parallel with the other pole, said second electro-responsive means includes a pair of solenoids, each of said solenoids being parallel with one of said poles of said single pole switch, and said switch means includes a pair of normally closed, parallel switches, one being in series with each of said solenoids.

7. In a transmission assembly adapted particularly for heavy duty use and for use with a power source having a power control, the combination comprising: a main transmission including an input shaft, an output shaft and ratio means providing a selectable drive ratio between said shafts in response to the speed of said output shaft and in response to said power control, said ratio means having constantly meshing gears and frictionally engageable clutch and brake means for determining the effective gear ratios between said input shaft and said output shaft; an auxiliary, positively engageable, two speed gear group including shiftable components and frictionally engageable synchronizers serially connected with said main transmission; a source of fluid pressure and power means actuated thereby for selectively shifting said shiftable components of said auxiliary gear group between the two speed ratio positions thereof wherein each shifting operation includes first engaging one of said synchronizers and subsequently shifting said shiftable components to the position thereof corresponding to the desired speed ratio; first electro-responsive means for actuating said frictionally engageable clutch and brake means within said main transmission to disconnect said input shaft from said output shaft; valve means controlling the flow of fluid to said power means; second electro-responsive means for operating said valve means; a source of electrical energy; manually responsive means for simultaneously connecting said source of electrical energy for energizing said first and second electro-responsive means; disconnect means responsible to a substantially completed shift in said auxiliary gear group for de-energizing said first and second electro-responsive means.

8. The device defined in claim 7 wherein said auxiliary gear group is connected to said output shaft.

9. In a transmission assembly having an automatic, speed and throttle responsive, main transmission and a shiftable, two speed, auxiliary gear group including shiftable components and being serially connected to said main transmission, the combination comprising: first electro-responsive means for causing said main transmission to enter its neutral condition; pressure actuated means for selectively shifting the shiftable components of said auxiliary gear group between the two speed ratio positions thereof; second electro-responsive means for actuating said pressure actuated means; electrically energized means for substantially simultaneously energizing said first and second electro-responsive means and means responsive to completion of a predetermined portion of a shift in said auxiliary gear group for de-energizing said first and second electro-responsive means.

10. In a transmission assembly including a main transmission, an input shaft, an output shaft and ratio means providing a selectable drive ratio between said shafts in response to the speed of said output shaft and in response to throttle control, said ratio means having constantly meshing gears and frictionally engageable clutch and brake means for determining the effective gear ratios between said input shaft and said output shaft and a first solenoid controlled valve for placing said main transmission in neutral and an auxiliary, positively engageable, two speed gear group including shiftable components and frictionally engageable synchronizers serially connected to said main transmission, the improvement which comprises: a source of fluid pressure; a pressure cylinder connected to said source of fluid pressure and to said auxiliary gear group for selectively shifting said shiftable components between the two speed ratio positions thereof; a second solenoid controlled valve controlling application of pressure from said source of fluid pressure to said cylinder; a source of electrical energy; a manually controlled switch connected to said first and second solenoid controlled valves and to said source of electrical energy and adapted to simultaneously connect said source of electrical energy for energizing the solenoids of said valves; and disconnect means responsive to a substantially completed shift in said auxiliary gear group for de-energizing the solenoids of said valves.

11. In a transmission assembly having an automatic, speed and throttle responsive, main transmission and a shiftable, two speed, auxiliary gear group including shiftable components and being serially connected to said main transmission, the combination comprising: first electro-responsive means for causing said main transmission to enter its neutral condition; pressure actuated means for selectively shifting said shiftable components between the two speed ratio positions thereof; second electro-responsive means for actuating said pressure actuated means; electrically energized means for substantially simultaneously energizing said first and second electro-responsive means and means for removing said main transmission from neutral condition substantially at the end of a shift in said auxiliary gear group.

12. In a transmission assembly having an automatic, speed and throttle responsive, main transmission and a shiftable two speed, auxiliary gear group, including shiftable components and frictionally engageable synchronizers, serially connected to said main transmission, the combination comprising: first electro-responsive means for neutralizing said main transmission; pressure actuated means for selectively shifting said shiftable components of said auxiliary gear group between their two speed ratio positions wherein each shifting operation includes first engaging one of said synchronizers and subsequently shifting said shiftable components to the position corresponding to the desired speed ratio thereof; second electro-responsive means for actuating said pressure actuated means, said second electro-responsive means including a pair of alternatively energizable solenoids and a core mounted for movement in response to energization of said solenoids, a valve connected for controlling application of pressure to said pressure actuated means and means connecting said core for operating said valve whereby said valve may be operated to apply pressure to said pressure actuated means in response to energization of one or the other of said solenoids to thereby shift said shiftable components of the auxiliary gear group between their two speed ratio positions; manually operable, electrically energized means for energizing said first electro-responsive means and simultaneously selecting and energizing one of the solenoids of said second electro-responsive means; and disconnect means responsive to a substantially completed shift in said auxiliary gear group for de-energizing said first electro-responsive means and said selected one solenoid of said second electro-responsive means.

13. In a transmission assembly having an automatic, speed and throttle responsive, main transmission and a shiftable two speed, auxiliary gear group, including shiftable components and frictionally engageable synchronizers, serially connected to said main transmission, the combination comprising: first electro-responsive means for neutralizing said main transmission; a first switch having an armature connected to said first electro-responsive means and having a pair of contacts; pressure actuated means for selectively shifting said shiftable components of said auxiliary gear group between their two speed ratio positions wherein each shifting operation includes first engaging one of said synchronizers and subsequently shifting said shiftable components to the position corresponding to the desired speed ratio thereof; a potential source; second electro-responsive means for actuating said pressure actuated means, said second electro-responsive means including a pair of alternatively energizable solenoids and a core mounted for movement in response to energization of said solenoids, a valve connected for controlling application of pressure to said pressure actuated means and means connecting said core for operating said valve whereby said valve may be operated to apply pressure to said pressure actuated means in response to energization of one or the other of said solenoids to thereby shift said shiftable components of the auxiliary gear group between their two speed ratio positions; a second, manually operable switch having an armature connected to said source and a pair of contacts, the contacts of said second switch being respectively connected to one of the contacts of said first switch and to one of said solenoids whereby upon manual operation of said second switch said first electro-responsive means and one of said solenoids will be energized; and disconnect means responsive to a substantially completed shift in said auxiliary gear group for de-energizing said first electro-responsive means and said selected one solenoid of said second electro-responsive means.

References Cited in the file of this patent
UNITED STATES PATENTS

| | | |
|---|---|---|
| 2,637,221 | Backus et al. | May 5, 1953 |
| 2,699,686 | Thomas | Jan. 18, 1955 |
| 2,738,690 | Perkins | Mar. 20, 1956 |
| 2,763,290 | Perkins et al. | Sept. 18, 1956 |